June 26, 1962 C. W. CARSON 3,040,783
DEFLECTION YOKE WINDING, SIZING AND CURING MACHINE
Filed July 7, 1958 7 Sheets-Sheet 1

INVENTOR:
CHARLES W. CARSON,
BY Joseph Levinson
HIS ATTORNEY.

June 26, 1962 C. W. CARSON 3,040,783
DEFLECTION YOKE WINDING, SIZING AND CURING MACHINE
Filed July 7, 1958 7 Sheets-Sheet 2
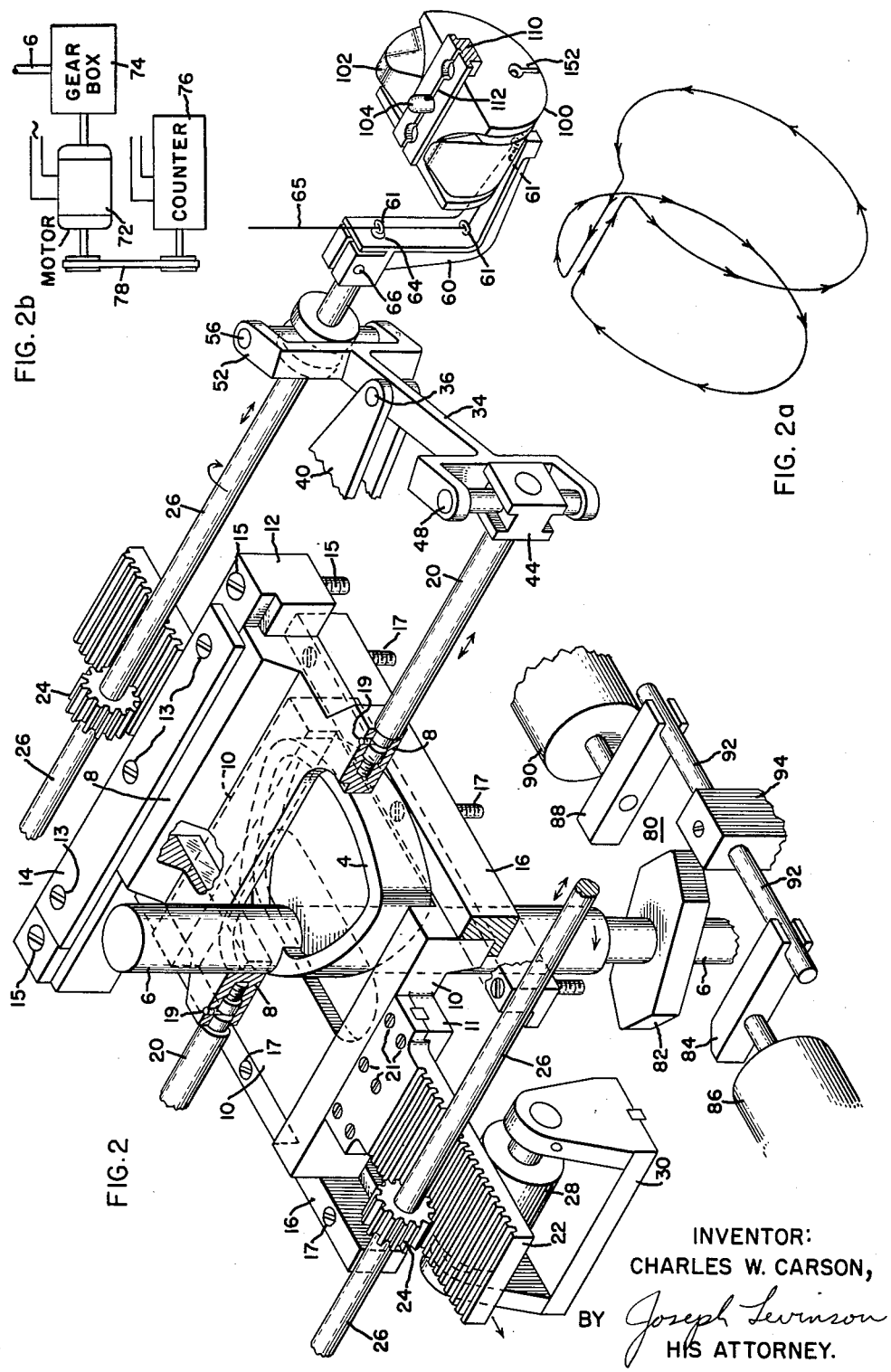
INVENTOR:
CHARLES W. CARSON,
BY Joseph Levinson
HIS ATTORNEY.

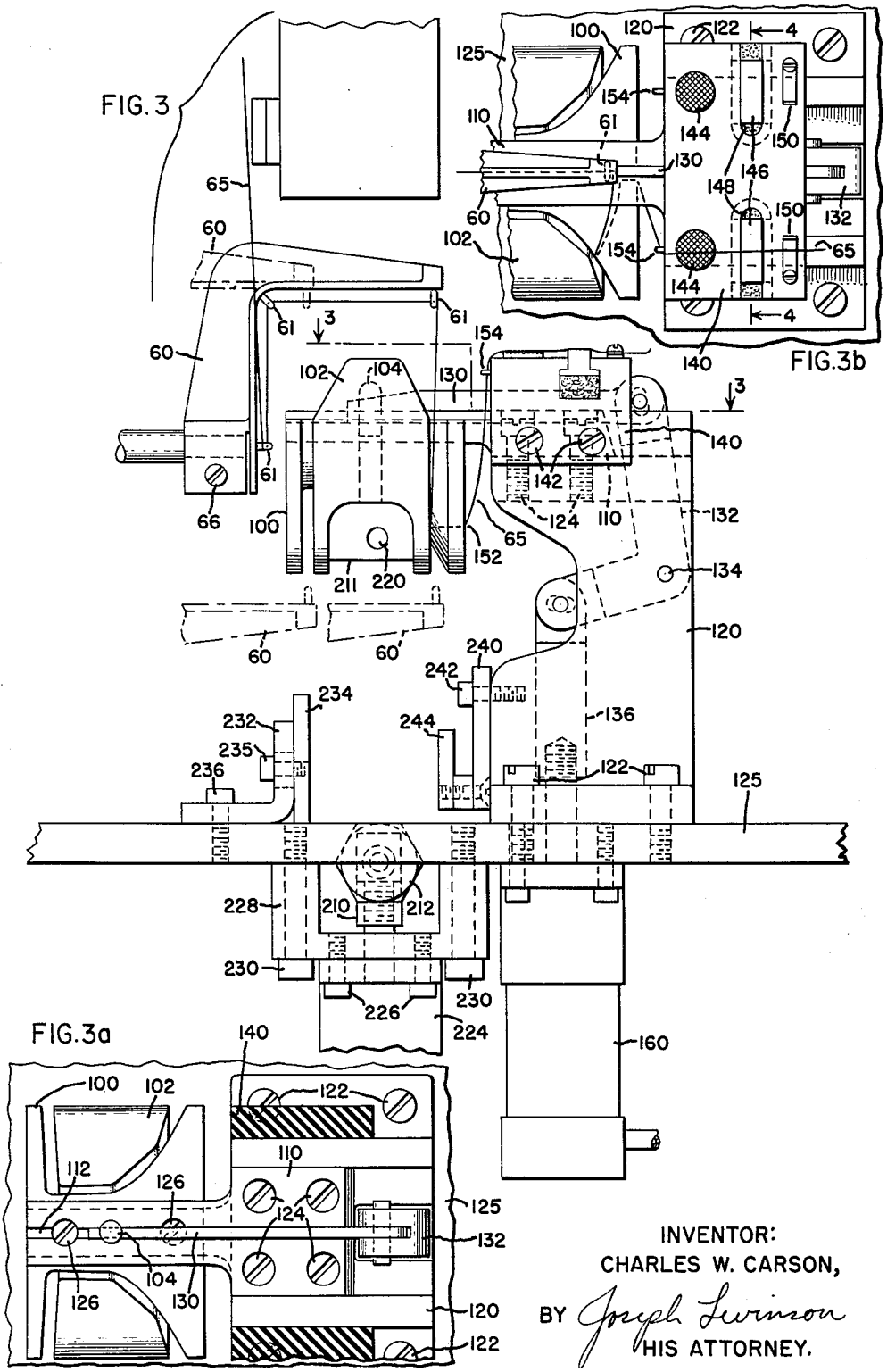

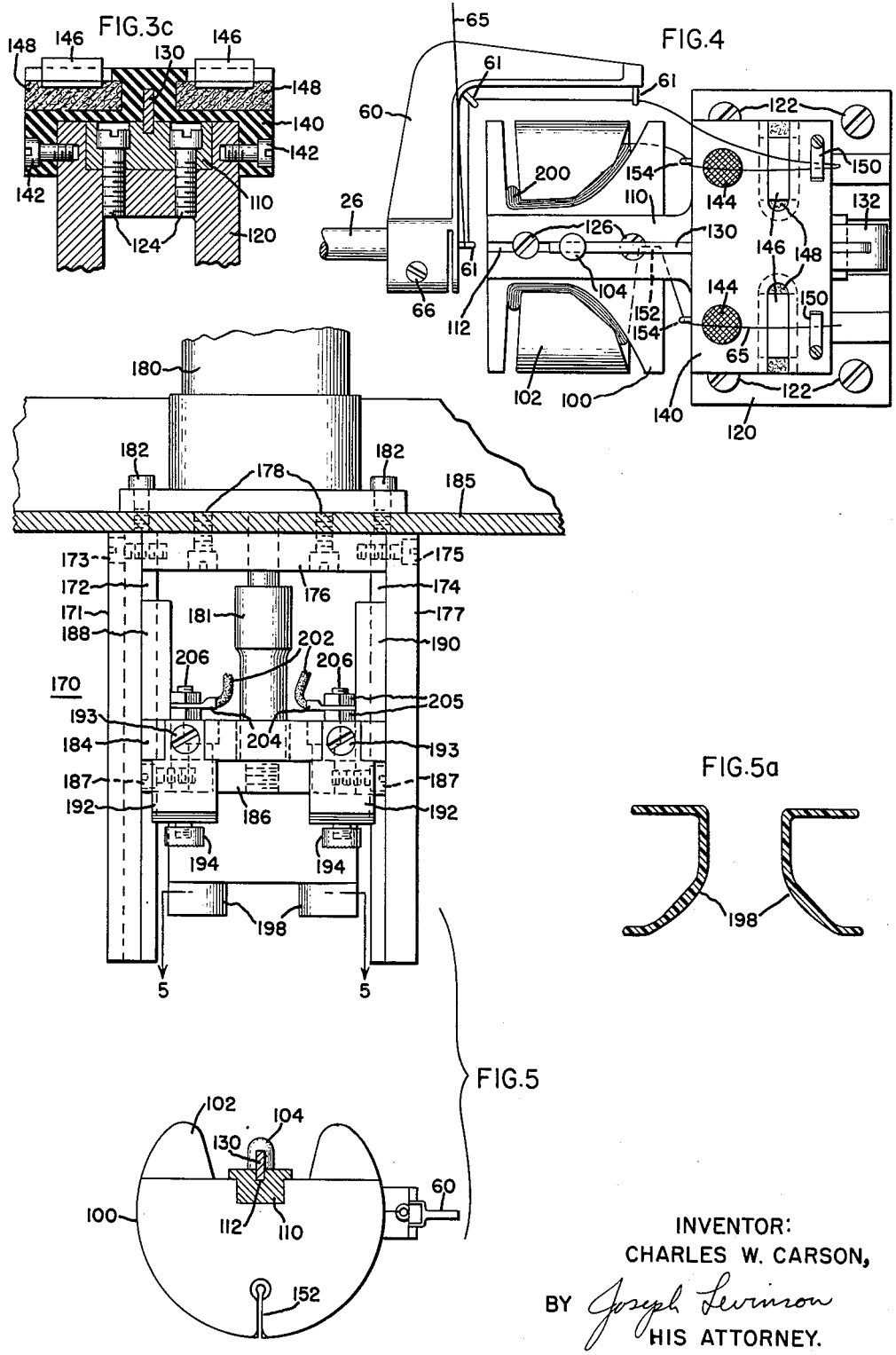

June 26, 1962  C. W. CARSON  3,040,783
DEFLECTION YOKE WINDING, SIZING AND CURING MACHINE
Filed July 7, 1958  7 Sheets-Sheet 5

INVENTOR:
CHARLES W. CARSON,
BY Joseph Levinson
HIS ATTORNEY.

June 26, 1962 C. W. CARSON 3,040,783
DEFLECTION YOKE WINDING, SIZING AND CURING MACHINE
Filed July 7, 1958 7 Sheets-Sheet 6
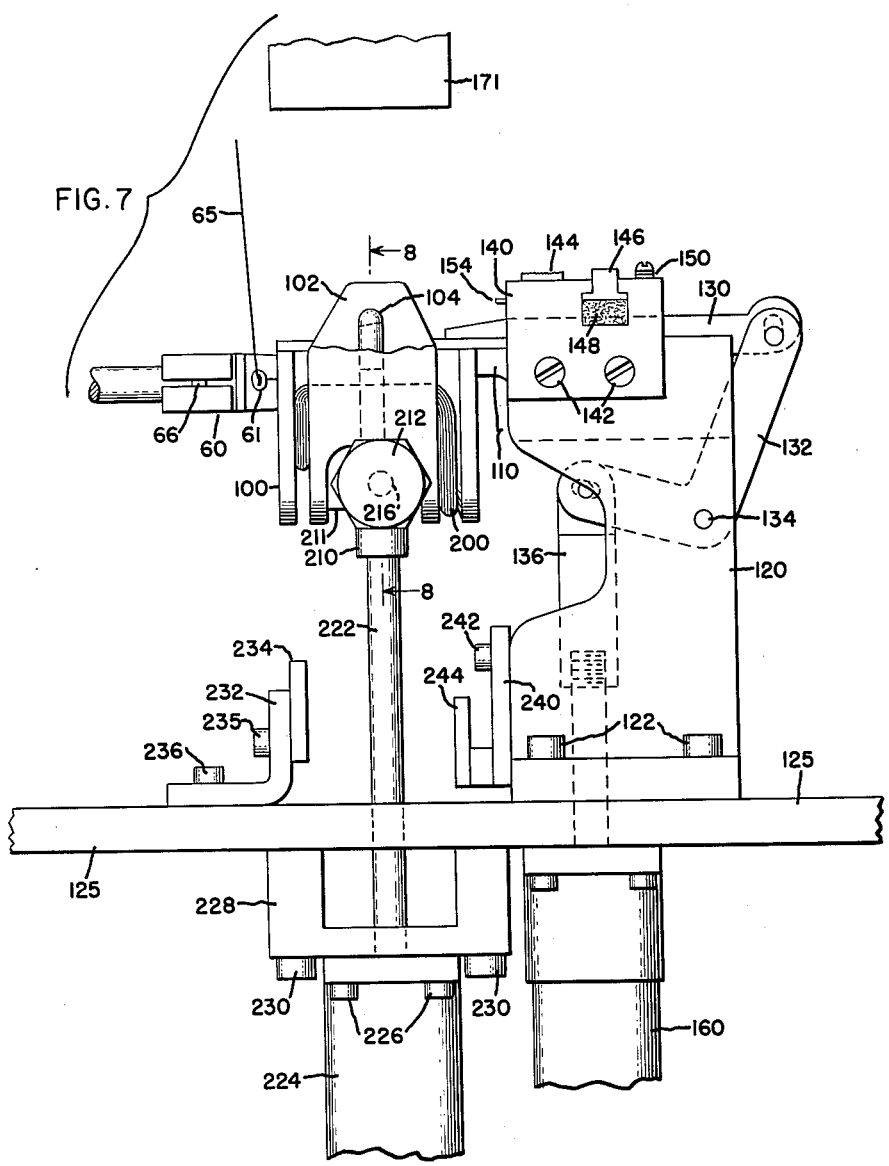
INVENTOR:
CHARLES W. CARSON,
BY Joseph Levinson
HIS ATTORNEY.

June 26, 1962 C. W. CARSON 3,040,783
DEFLECTION YOKE WINDING, SIZING AND CURING MACHINE
Filed July 7, 1958 7 Sheets-Sheet 7
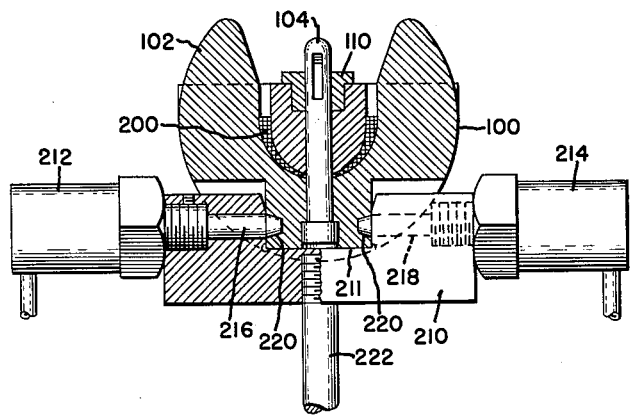
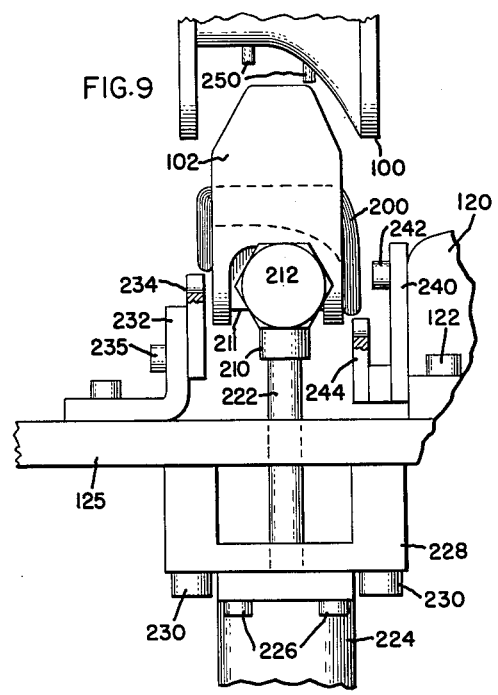
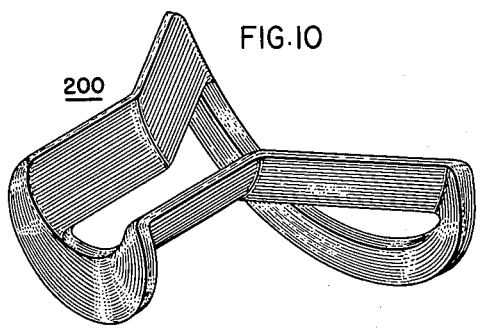
INVENTOR:
CHARLES W. CARSON,
BY Joseph Levinson
HIS ATTORNEY.

United States Patent Office 3,040,783
Patented June 26, 1962

3,040,783
DEFLECTION YOKE WINDING, SIZING AND CURING MACHINE
Charles W. Carson, East Syracuse, N.Y., assignor to General Electric Company, a corporation of New York
Filed July 7, 1958, Ser. No. 747,026
12 Claims. (Cl. 140—92.2)

This invention relates to a machine for automatically winding, packing and curing a coil of the type utilized in deflection yokes for cathode ray tubes.

Coils used in yokes for deflection systems of cathode ray tubes are generally saddle-shaped with a bell-shaped opening therein. One method used in forming a coil of this type consists of space winding the coil in flat form, then shaping the coil to the desired configuration. The inherent difficulty with this method resides in the inability to precisely form the coil in the desired configuration without shorting or fracturing the wires in the coil. It is also difficult to tightly pack a coil formed in this manner. This latter consideration is important because the efficiency of the coil is dependent to a certain extent on the full utilization of space with turns of wire. Generally, the tighter a coil is wound or packed, the greater the coil efficiency.

In order to machine wind a yoke coil, wire must be wound on a winding form of desired shape. Due to the unusual shape of the coil to be wound, it is necessary to impact both a linear and a radial motion to the wire in a predetermined sequence. In one known method, a winding form is mounted on an arbor which is reciprocated for imparting radial motion to the wire, and the wire is fed to the winding form by a traverse arm which moves back and forth thereby imparting the necessary linear motion to the wire. After winding is completed, the arbor must be removed by the operator and inserted into another machine for packing and curing. Packing consists of merely forcing the wire together into a given area and is necessary due to the inability of the machine to wind the coil tight enough. Curing consists of heating the coil by applying an electrical current through it which fuses the insulation between the turns to hold the coil together. This known method of machine winding is superior to shaping a flat wound coil, however, it has several disadvantages. The winding motion is derived from two sources one of which is the winding form. This puts undue tension on the wire in the winding process resulting in a large number of rejects. The machine is subject to mechanical strain due to the method of obtaining the desired winding motion resulting in breakdowns. Also, after the winding operation the operator must transfer the heavy arbor containing the winding forms to another machine to complete the coil by packing and curing it.

Accordingly, it is an object of this invention to provide a novel coil winding machine which automatically winds, packs and cures a yoke coil.

A further object of this invention is to provide a novel coil winding machine which is fully adjustable to allow the machine to wind a variety of coil shapes and sizes.

Still a further object of this invention is to provide a novel winding machine having a winding motion which allows the coil to wind more freely with less tension thereby considerably reducing the number of rejects inherently associated with known winding methods.

Another object of this invention is to provide a novel winding machine which winds tighter coils than can be made by known methods.

A further object of this invention is to provide a coil winding machine which automatically resets the winding fly after a coil has been wound to ready the machine for the next winding cycle.

Still a further object of this invention is to provide a novel winding machine which ejects the coil after the winding, packing and curing cycles and then readies the machine for a subsequent winding operation.

In carrying out this invention, a winding station is provided having a winding form of a desired configuration mounted thereon. A winding fly which is driven by a cam mechanism feeds wire onto the winding form in a predetermined pattern. The cam mechanism consists of an equilateral cam revolving about one of its three major axes and a pair of U-shaped cam followers, one above the other, enveloping the cam. The motion generated to the winding fly is a square-cornered, rectangular motion with the motion of the longer legs being radial and oscillating, and the motion of the shorter legs being reciprocal and linear. After the winding operation, the winding fly is automatically reset by an indexing means to a horizontal position which readies the machine for a subsequent winding operation. The coil is then packed and cured by an activated packing station. After curing, the winding form is automatically disassembled and the coil ejected therefrom. After the coil is removed by the operator, means are provided for reassembling the winding form to ready the machine for a new winding cycle.

These and other advantages of this invention will be more clearly understood from the following description taken in connection with the accompanying drawings, and its scope will be apparent from the appended claims.

In the drawings:

FIGURE 2 is an enlarged, isometric view, partly in section, of the cam mechanism of FIGURE 1 and includes a shaft orienting mechanism and a winding form head;

FIGURE 2(a) shows diagrammatically the wind pattern followed by the winding fly and imparted thereto by the cam mechanism of FIGURE 2;

FIGURE 2(b) is a diagrammatic showing of the drive for the cam mechanism of FIGURE 2 including a counter;

FIGURE 3 shows a side view of a winding station;

FIGURE 3(a) is a cross-sectional view taken along lines 3—3 of FIGURE 3;

FIGURE 3(b) shows a partial top view of the winding station of FIGURE 3 with the station set for the beginning of a winding cycle;

FIGURE 3(c) is a cross sectional view of FIGURE 3(b) taken along lines 4—4;

FIGURE 4 is a top view of a wind station at the end of a wind cycle;

FIGURE 5 is a front view of the packing and curing station;

FIGURE 5(a) is a cross-sectional of the packer taken along lines 5—5 of FIGURE 5;

FIGURE 7 is a side view of the wind station showing the winding form head being readied for disassembly;

FIGURE 8 is a cross-sectional view taken along lines 8—8 of FIGURE 7;

FIGURE 9 is a side view of the winding form being disassembled; and

FIGURE 10 is a perspective view of the type of coil which is wound by the winding machine of this invention.

Figure 1:
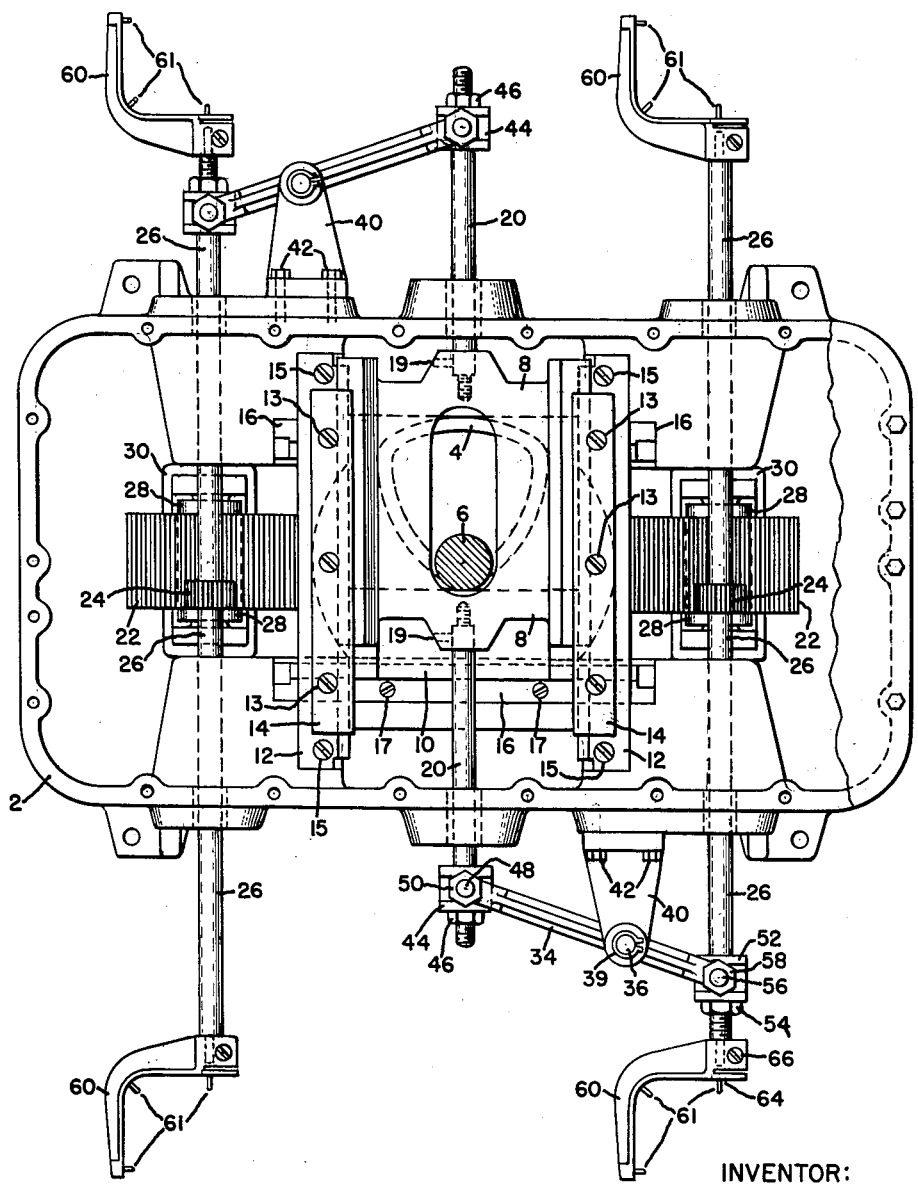
FIGURE 1 is a top view of the cam mechanism (cover removed) for imparting the desired winding motion to a plurality of winding flies.

The winding machine embodied in this invention consists primarily of a cam mechanism for driving a plurality of winding flies in a predetermined pattern, a winding station and a packing station. FIGURES 1 and 2 show the cam mechanism which includes an equilateral cam 4, an upper cam follower 8 and a lower cam follower 10. The cam followers are generally U-shaped and are positioned to completely surround the cam 4. The upper cam follower 8 is adapted to move in a pair of ways 12 and is held in a position by a retainer plate 14. The retainer plate 14 is secured by a plurality of screws 13 to the way 12 which in turn is secured to the case 2 by a plurality of screws 15. The lower cam follower 10 is mounted for slidable movement in a pair of ways 16 which are secured to the case 2 by a plurality of screws 17. A pair of push rods 20 are secured to the upper cam follower 8 by a pair of set screws 19. Each of the legs of the lower cam follower 10 is provided with a flange 11 to which a rack 22 is secured by a plurality of screws 21 (see FIGURE 2). A pinion 24 mounted on shaft 26 rides on the rack 22. The rack 22 rides on a plurality of roller bearings 28 which are rotatably mounted in a pair of brackets 30. This structure is all mounted in the case 2 and immersed in an oil bath to limit friction.

A cantilever arm 34 is mounted for pivotal movement on a pin 36 in a bracket 40. The pin 36 which is the fulcrum point of the arm 34 is secured to the bracket 40 by a snap ring 39. The bracket 40 is secured to the case 2 by a plurality of screws 42. The push rod 20 is coupled to one end of the cantilever arm 34 by a shifter 44. The shifter 44 is held on the push rod 20 by a jam nut 46. The shifter 44 is pivotally and slidably mounted to the cantilever arm 34 by a pin 48 which is secured to the cantilever arm 34 by a jam nut 50. The shaft 26 is coupled by a shifter 52 to the other end of cantilever arm 34 and secured thereto by a jam nut 54. The shifter 52 is pivotally, slidably and rotatably coupled by a pin 56 to the cantilever arm 34 and secured thereto by a jam nut 58. The shifter 52 is adapted to accommodate the radial motion imparted by the pinion 24 and the shaft 26 and still allow for the linear motion imparted through the push rod 20 and the cantilever arm 34 to the shaft 26. A winding fly 60 is mounted on each end of the shafts 26. A bearing 64 is provided on the fly 60 coinciding with the center line of the shaft 26. The fly 60 is held in place by a screw 66. The fly 60 is provided with a plurality of eyes 61 mounted thereon for receiving the wire which is to be wound into a coil.

It will be noted that the cam mechanism shown in FIGURE 1 drives a plurality of winding flies 60. As will appear obvious, if only one or two of the desired winding flies are desired to be utilized, the structure relating to the others could be eliminated. However, the preferred structure shown in FIGURE 1 is a highly balanced system and provides greater utilization and economy when the same cam mechanism is used to drive a plurality of units.

In discussing the operation of the cam mechanism, only the motion imparted to the winding fly shown in the upper left hand corner of FIGURE 1 which is also shown in FIGURE 2 will be described in order to simplify the explanation. Referring now to FIGURE 2, as the shaft 6 is rotated clockwise as indicated by the arrow on the shaft, the lower cam follower 10 is pushed outward thereby rotating the pinion 24 and the shaft 26 which is driven thereby in a clockwise direction. The shaft 26 rotates the winding fly 60 in a clockwise direction as indicated by the arrow. As shown on FIGURE 2, the upper cam follower 8 remains relatively fixed during the movement of the lower cam follower 10. Consequently, no motion is transmitted via the push rod 20 to the cantilever arm 34. When the rack 22 reaches its outermost position the lower cam follower 10 which drives the rack 22 stops moving, and the upper cam follower 8 begins moving thereby pulling the push rod 20 to the left or toward rack 22. Consequently, the upper cam follower 8 generates a linear motion to the push rod 20, which pivots the cantilever arm 34 about the fulcrum point 36 of bracket 40. Accordingly, the shaft 26 is pulled to the right and the pinion 24 slides horizontally to the right along the rack 22. The upper cam follower then takes over again moving the rack inward thereby rotating pinion 24 in a counter-clockwise direction and the cycle is thereby repeated in the opposite direction. FIGURES 2(a) shows diagrammatically the wind pattern which is transmitted to the winding fly 60 by the cam mechanism. This pattern has just been described. In short, the upper cam follower transmits a linear motion via the push rod 20 and the cantilever arm 34 to the shaft 26 and to the winding fly 60. The lower cam follower 10 transmits a radial motion via the rack 22 and pinion 24 to the shaft 26 and therefore to the winding fly 60. The winding pattern shown on FIGURE 2(a) is continued until the proper number of turns are wound on a winding form 100 which has a configuration corresponding to the desired shape of the coil to be wound thereon.

The cam mechanism embodied in this invention is quite flexible and can be utilized to wind coils of various shapes and sizes. For example, the length of linear motion or throw can be varied by varying the position of the fulcrum point 36 of the bracket 40 on which the cantilever arm 34 pivots. The degree of radial rotation of the winding fly 60 may be varied by changing the size and/or the spacing of the rack 22 and the cooperating pinion 24.

As will be seen from FIGURE 2(a), the winding pattern achieved by this invention may be termed as a square-cornered, rectangular motion having two long parallel legs defined by a reciprocal radial motion and two short parallel legs which result from linear motion. The motion is actually achieved by utilizing two separate cam followers which are alternately activated by the equilateral cam. One accomplishment of the cam mechanism of this invention resides in the smooth transition from the operation of one cam follower to another such that the winding motion is continual and smooth to provide the square-cornered, rectangular pattern shown in FIGURE 2(a).

The cam mechanism shown in FIGURES 1 and 2 may be driven by a motor 72 shown in FIGURE 2(b). The motor 72 is coupled through a gear box 74 to the shaft 6. An automatic resetting counter 76 is coupled by a chain 78 to the motor 72. The counter 76 is of the type which can be run in either direction. Its purpose is to count the number of turns which are being wound on the winding form 100. At the end of a particular winding cycle, the counter may activate a relay to break the mechanical motion of the system. The electrical circuitry including the relays utilized therein are of conventional form and are not set forth in detail in this application in order to simplify the explanation of the machine. The counter 76 may be set to wind any number of turns allowing the winding of a variety of different coils. At the end of any particular winding cycle, the counter would automatically by way of a relay or any other suitable means deactivate motor 72 by removing the electrical power therefrom.

At the end of any given wind cycle, it is essential that the winding fly 60 be in a horizontal position in order that subsequent operations can be performed on the coil which has been wound. This will become apparent as these operations are explained subsequently. A fly orientating mechanism referred to generally with the reference character 80 performs this function and is shown in FIGURE 2. The winding fly orientating mechanism 80 has a cam 82 mounted on the cam shaft 6. The cam 82 comes to rest after the counter 76 has inactivated the motor circuit. An alignment bar 84 is activated by an air cylinder 86 to contact the cam 82 insuring that the cam 82 is not normal to the face of the alignment bar 84. Subsequently, an air cylinder 90 is activated to move an alignment bar 88 toward the cam 82 whereby both of the alignment bars 84 and 88 orient the cam 82 in parallel relationship with the alignment bars. When the cam 82 is so aligned the winding fly 60 assumes a horizontal position. The alignment bars 84 and 88 are slidably mounted on a rod 92 which is secured to a block 94. The air cylinders 86 and 90 are conventional solenoid activated air cylinders having a plunger type action when activated. They may be activated in sequence by a pair of relays which are activated at the completion of a wind cycle.

The winding motion which has been described is transmitted by the winding fly 60 to a wire 65 which passes through the eyelets 61 of the winding fly and is wound on a winding form head 100. The wire 65 is fed from a wire supply (not shown) which has associated therewith some form of tensioning means (not shown) for feeding the wire 65 to the winding form head 100 under tension. The winding form 100 is attached to and forms a part of the winding station shown in FIGURES 3 and 4. The winding form 100 has a removable insert 102. The winding form 100 and the insert 102 form the desired configuration of the coil to be wound thereon. The winding form 100 has a mounting arm 110 secured thereto by means of a pair of screws 126 as shown in FIGURE 3(a). The mounting arm 110 is secured to a mounting block 120 by means of a plurality of screws 124. The mounting block 120 is in turn mounted on a portion of the super-structure 125 of the machine by a plurality of screws 122. The winding insert 102 is provided with a latching stud 104 having an opening therein which registers with a channel 112 in the winding head mounting arm 110. The channel 112 and the opening in the mounting stud 104 are adapted to accommodate a bayonet locking arm 130. The bayonet locking arm 130 is connected to an insert locking lever 132 which is mounted on the block 120 by a pin 134. The insert locking lever 132 is also mounted on a clevis 136 which is adapted to be activated by an air cylinder 160. This mechanism is adapted to lock and unlock the insert assembly 102 from the winding form head 100 and will be described in detail in connection with FIGURE 7.

Referring now to FIGURES 3(b) and 3(c), a block 140 of suitable insulating material is secured to the mounting block 120 by a plurality of screws 142. The block 140 contains a pair of contact surfaces 144, a pair of cutting anvils 146 mounted on resilient spacers 148, and a pair of clips 150 which are adapted to receive and hold the wire 65 in place. A cross-sectional view of the block 140 showing its construction and mounting is shown in FIGURE 3(c). At the beginning of a wind cycle, the wire 65 is inserted in a slot 152 in the winding form 100 (see FIGURE 5), then wound over a post 154 and positioned across one of the contacts 144, one of the cutting anvils 146 and under one of the clips 150 and is held in place thereby. This will be seen in FIGURE 3(b) which shows the machine in readiness for a wind cycle with the wire 65 secured in one of the clips 150.

FIGURE 3 shows the winding fly in several positions as indicated by the dotted lines which characterize the square action which is transmitted to the winding fly 60 by the cam mechanism. The winding fly 60 is shown in a vertical position for illustrative purposes as the wind cycle actually begins with the winding fly 60 in a horizontal position. At the completion of the wind cycle, a coil 200 is wound in the winding form 100 as shown in FIGURE 4. The winding fly 60 is returned to a horizontal position by the fly orienting mechanism as previously described. The other end of the wire 65 is then wound around the other post 154 across the other contact 144 and cutting anvil 146 to the other clip 150. The machine is then ready for the packing and curing operation which is accomplished by activating the packing station 170.

FIGURE 5 shows a view of the packing station 170 in its inactivated position above the winding form head 100. The packing station 170 is driven by an air cylinder 180 which is mounted by screws 182 to a portion of the super-structure 185 of the machine. The air cylinder 180 is coupled to an insulated mounting block 184 and a mounting plate 186 by an adaptor 181. When the air cylinder is activated, the insulating block 184 and mounting plate 186 are adapted to be moved thereby. To accommodate such movement a pair of ways 171 and 177 having keys 172 and 174, respectively, are provided which are mounted on a plate 176 by screws 173 and 175, respectively. The plate 176 separates the ways 177 and 171 and is secured to the super-structure 185 by screws 178. A pair of sides 188 and 190 are secured by screws 187 to the mounting plate 186 and are adapted to accommodate slidable movement along the ways 171 and 177, respectively. A packing head 198 is mounted on the mounting plate 186 and has a configuration as shown in FIGURE 5(a). It will be noted that the configuration of the packing head 198 corresponds to the configuration formed by the winding form head 100 and insert 102 and corresponds to the shape of the coil to be wound thereon. The insulated block 184 accommodates a pair of cutting blades 192 which are mounted thereon by a pair of screws 193. The insulated block 184 is also provided with a pair of terminal posts 206 of electrical conductive material which are terminated at one end thereof in a pair of electrical contacts 194. A pair of electrical conductors 202 having terminals 204 are secured to the other end of the terminal posts 206 by nuts 205. A spring 208 (see FIGURE 6) is mounted between the insulated block 184 and the contact 194.

Figure 6:
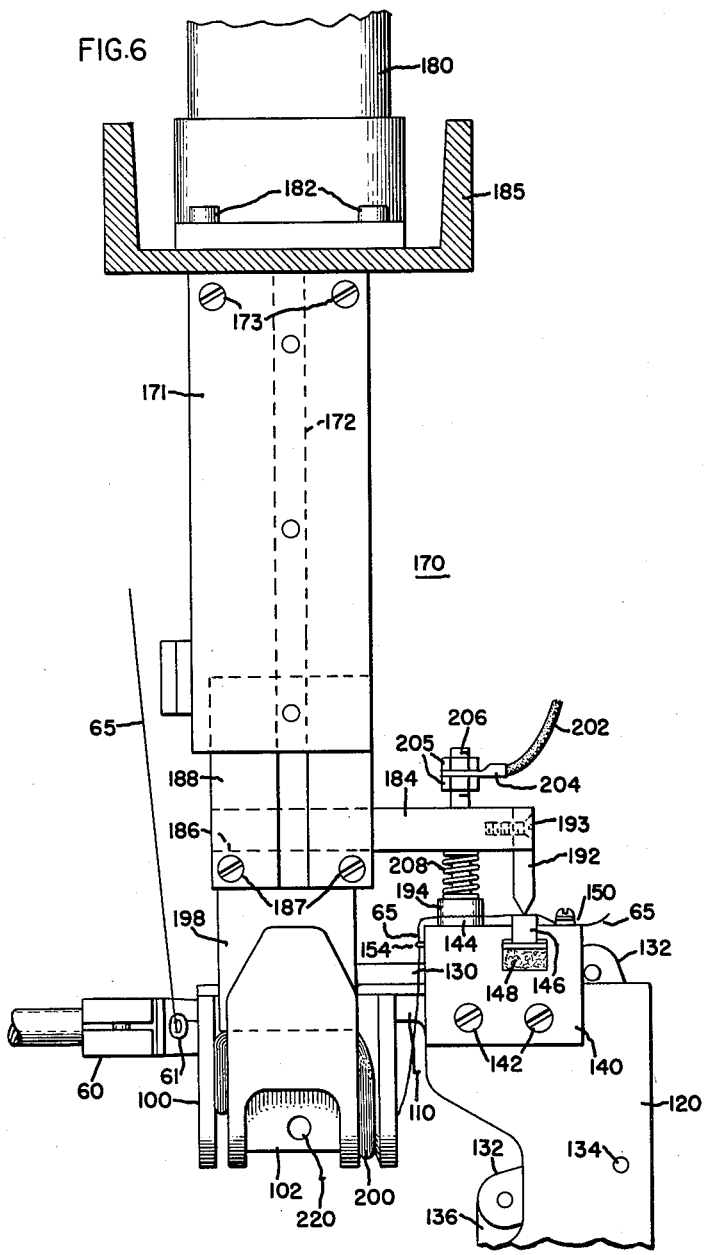
FIGURE 6 is a side view of the packer station in its operated position on the wind station.

FIGURE 6 shows the packing station 170 in an activated position. This may be accomplished by merely activating the air cylinder 180 by means of a switch and valve whereby power is applied to the solenoid of the air cylinder. As will be seen in FIGURE 6, the packing station 170 in its activated position brings the packer 198 into contact with the coil 200 thereby forming the contacted surface of the coil to an accurately predetermined size. At the same time, cutting blades 192 cut the wires 65 on the anvils 146. Also, the wires 65 are secured between the contact pairs 194 and 144 to establish electrical contact between the wires 65 and the electrical conductors 202. When the coil reaches a predetermined size, as is determined by the distance traversed by the packer 198, a regulated amount of current is supplied to the wires 202 and thereby applied through the coil 200. This may be accomplished by having the packer 198 trip a microswitch to provide current in the electrical conductors 202 after the packer 198 has reached a predetermined position. Circuit breakers may be inserted in the circuit of wires 202 in order to break the circuit in case of a short in the coil 200. This would prevent the coil from burning and damaging the machine should there be a short in the coil 200. The amount of current applied and the time it is applied may be controlled by a suitable timer and relay circuitry. By passing current through the coil 200, the coil is heated thereby fusing the insulation between the turns to hold the coil together. After the current is applied, the coil is cooled by any suitable means, such as a stream of air (not shown), and the packing station then returns to its inactivated position. The entire cycle of operation of the packing station may be controlled by a conventional timer.

At the conclusion of the packing and curing operation, all that remains is for the coil 200 to be removed, and the machine made ready for a subsequent operation. This function is accomplished automatically at the winding station. A portion of the disassembling structure was described with reference to FIGURE 3 which shows the entire disassembling means in its inactivated position. FIGURE 7 shows the disassembling structure in its activated position. This structure includes a disassembly nest 210 which is adapted to be driven by a plunger 222 of an air cylinder 224. The air cylinder 224 is mounted on a bracket 228 by screws 226. The bracket 228 is mounted by screws 230 to a portion of the super-structure 125 of the machine. The nest 210 has housed thereon a pair of air cylinders 212 and 214 which drive a pair of pins 216 and 218, respectively (see FIGURE 8).

When the air cylinder 224 is suitably activated, for example, by closing a circuit to the solenoid of the air cylinder, the plunger 222 pushes the nest 210 upward into engagement with a flat surface 211 on the underside of winding form insert 102. On the completion of the stroke of the air cylinder 224, the air cylinders 212 and 214 are activated causing the pins 216 and 218 to grasp the cap portion of the winding form insert 102. The pins register with a pair of openings 220 in the insert 102. The activation of the air cylinders 212 and 214 may be controlled by relays which are activated upon the completion of the stroke of the air cylinder 224. Air cylinder 160 is thereupon activated causing the bayonet locking arm 130 to be removed from the insert stud 104 as shown in FIGURE 7. On completion of the unlocking of the insert 102, the air cylinder 224 is reversed thereby disassembling the insert 102 from the coil form head 100 as shown in FIGURE 9. During the reverse stroke of air cylinder 224, the coil 200 is wiped off and ejected from the insert 102 by a pair of contoured ejector blocks 234 and 244 conforming to tail and front flare of the coil, respectively. The tail flare ejector 234 is mounted on a bracket 232 by a screw 235, and the bracket 232 is mounted on the super-structure 125 by a screw 236. The front flare ejector 244 is mounted on a bracket 240 which is secured to the mounting block 120 by a screw 242. As will also be seen in FIGURE 9, the winding form head 100 has a pair of alignment dowels 250 registering with openings in the insert 102 for alignment purposes.

Upon the completion of the unlatching and disassembly operation, the operator removes the coil 200 which is held by flare ejectors 234 and 244, and the machine is ready to be reassembled to accommodate a subsequent winding operation. The operator then activates the cylinder 224 by a suitable switch. The air cylinder 224 forces the insert 102 back into engagement with the coil form head 100. On the completion of the stroke of the air cylinder 224, the insert locking cylinder 160 is reversed thereby causing the bayonet locking arm 130 to be reinserted into the opening 106 of the stud 104 of the insert 102 thereby locking the insert to the winding form head 100. The air cylinders 212 and 214 are reversed unlocking the drive pins 216 and 218, whereupon the air cylinder 224 is reversed, returning the disassembly mechanism to a lowered position. The machine is then readied for another winding operation as shown in FIGURE 3.

The finished coil 200 is shown in FIGURE 10. It has a saddle-shaped configuration with a bell-shaped opening therein. The coil is utilized in deflection yokes for cathode ray tubes. Four coils are generally used to form the aforesaid yokes which envelop the neck portion of a cathode ray tube. The machine described is adjustable to wind various shapes and sizes of coils to accommodate specific configurations and circuit requirements.

The complete operation of the machine will now be described briefly. At the beginning of the wind cycle the machine operator hooks the wire 65 from the winding fly 60 under the clip 150 at the wind station. The motor 72 is then activated by any suitable switching means. The motor 72 drives the cam mechanism which in turn imparts the square-cornered, rectangular motion to the winding fly 60 thereby wrapping a predetermined number of turns upon the winding form head 100. The automatic resetting counter 76 is set for a predetermined number of turns after which the motor circuit is inactivated thereby breaking the cam mechanism and stopping the winding fly. The fly orienting mechanism 80 is then automatically activated to align the winding fly 60 in a horizontal position so that subsequent operations may be performed on the coil which has been wound on the winding form. The machine operator then hooks up the finish lead of the wound coil under the other clip 150. The packing station is then activated by any suitable switching mechanism which activates the air cylinder 180 to bring the packing station on the coil. The packer 198 forces the turns of wire together a predetermined amount in accordance with the stroke of the cylinder 180, the cutter blades 192 sever the leads of the coil, and an electrical current is applied from wires 202 through the coil. The coil is thereby heated and then allowed to cool. The amount of current applied to the coils and the length of time which is applied may be controlled by a timer and suitable circuitry. The circuitry may also contain circuit breakers to prevent the application of current to a coil having a short circuit to thereby protect the machine from a burning coil. At the completion of the packing and curing cycle, the packing station is withdrawn by the reverse operation of the air cylinder 180. The air cylinder 224 is then activated whereby the nest 210 engages the insert 102 to ready the insert 102 for disassembly. The air cylinder 160 is then activated for removing the bayonet locking arm 130 from the insert 102. The stroke of the air cylinder 224 is then reversed thereby disassembling the insert 102 from the winding form head 100 and leaving the coil 200 suspended on the flare ejectors 234 and 244. The coil is then removed by the operator and air cylinder 224 is reactivated thereby reassembling the insert 102 in the coil form 100. The cylinder 160 is again activated for reinserting the bayonet locking arm 130 into the stud 104 of the insert 102 to thereby latch the insert 102 to the winding form head 100. The air cylinder 224 is reversed to a lowered position completing the cycle. These operations may all be controlled by suitable circuitry including relays and valves which may be activated by microswitches. The microswitches of course may be activated by predetermined movements caused by the operation of the mechanical motion of the parts controlled by the air cylinders.

The machine which has been described is capable of manufacturing any conventional yoke coil which is presently utilized in the art. It has been found that a greater number of turns can be wound by this machine in a given area than by any other method now employed for making yoke coils. This means greater coil efficiency.

The motion imparted to the winding fly by the cam mechanism embodied in this machine allows the coil to be wound on the winding form with a minimum amount of tension being applied to the wire during the winding cycle. This is attained because of the square-cornered, rectangular motion imparted to the winding fly by the cam mechanism. It has been found that the number of faulty coils made by this machine is far less than by any known yoke winding method or machine. For example, in the forming of yoke coils by shaping a flat wound coil, the rejection percentage runs as high as 60% while the rejection rate of coils wound on the machine embodied in this invention runs below 5%.

The electrical circuitry which is necessary for the activation of the various portions of this machine is deemed to be conventional and forms no part of the invention and is not described in detail for this reason. Any number of different electrical circuits and switching arrangements may be employed to operate the machine in a manner described by the applicant.

Since other modifications vary to fit particular operating reqirements and environments it will be apparent to those skilled in the art, the invention is not considered limited to the examples chosen for purposes of disclosure and covers all modifications and changes which do not constitute departures from the true spirit and scope of this invention.

What I claim as new and desire to secure by Letters Patent of the United States is:

1. In a yoke coil winding machine comprising in combination, a winding station whereat is located a winding form of desired configuration, a winding fly for feeding wire to said winding form in a predetermined pattern, a cam mechanism having a cam and a pair of cam followers for driving said winding fly with a predetermined motion which consists of a combination of linear and radial motion to define said predetermined pattern, means coupled to one of said cam followers for imparting a radial motion to said winding fly which defines a pair of radial parallel legs, and means coupled to the other cam follower for imparting a linear motion to said winding fly which defines a pair of parallel linear legs interconnecting said pair of radial parallel legs thereby forming said predetermined pattern.

2. A yoke coil winding machine comprising in combination, a winding form having a predetermined configuration corresponding to the shape of the coil to be wound thereon, a winding fly for feeding wire to said winding form, an equilateral cam, means for rotating said cam about one of its three major axes, an upper cam follower and a lower cam follower driven by said equilateral cam, means for coupling said lower cam follower to said winding fly for imparting a predetermined radial motion thereto when said lower cam follower is activated by said equilateral cam, means for coupling said upper cam follower to said winding fly for imparting a predetermined linear motion thereto when said upper cam follower is moved by said equilateral cam whereby a predetermined motion is imparted to said winding fly for winding a coil of desired shape thereon.

3. A yoke coil winding machine comprising in combination, a winding station whereat is located a winding form of predetermined configuration, a winding fly for feeding wire to said winding form, an equilateral cam, means for rotating said equilateral cam about one of its three major axes, a pair of U-shaped cam followers surrounding said equilateral cam and being driven thereby, a first means coupling one of said U-shaped cam followers to said winding fly for imparting a predetermined radial motion thereto, a second means coupling said other U-shaped cam follower to said winding fly for imparting a predetermined linear motion thereto whereby a radial, square-cornered, rectangular motion is imparted to said winding fly by said first and second means for winding a coil on said winding form.

4. A yoke winding machine comprising in combination, a winding station whereat is located a winding form, a motor, a shaft driven by said motor, an equilateral cam coupled on one of its three major axes to said shaft for rotation therewith, a pair of U-shaped cam followers enveloping said cam and being driven thereby, a winding fly for feeding wire to said winding form in a predetermined pattern, means coupled between one of said U-shaped cam followers and said winding fly for imparting a radial motion to said winding fly when activated by said equilateral cam, means coupled between the other of said U-shaped cam followers and said winding fly for imparting a linear motion to said winding fly when activated by said equilateral cam, and an indexing means associated with said shaft for positioning said winding fly in a predetermined position when said indexing means is activated.

5. A yoke coil winding machine comprising in combination, a winding station whereat is located a winding form of predetermined configuration, an equilateral cam, means for rotating said equilateral cam about one of its three major axes, a pair of U-shaped cam followers surrounding said equilateral cam and being driven thereby, a pivotal cantilever arm, a push rod coupled between one of said U-shaped cam followers and one end of said cantilever arm, a rack secured to the other of said U-shaped cam followers, a shaft having a pinion mounted thereon riding on said rack, means for coupling said shaft to the other end of said cantilever arm, and a winding fly mounted on the end of said shaft for feeding wire to said winding form.

6. A yoke coil winding machine comprising in combination, a winding station whereat is located a winding form of predetermined configuration, an equilateral cam, means for rotating said equilateral cam about one of its three major axes, a pair of U-shaped cam followers surrounding said equilateral cam and being driven thereby, a cantilever arm which may be pivoted at a fulcrum point, a push rod coupled to one of said U-shaped cam followers, a first shifter coupled between said push rod and said cantilever arm for transmitting a linear motion from said push rod to said cantilever arm, a rack mounted for movement with said other U-shaped cam follower, a shaft having a pinion mounted thereon riding on said rack, a second shifter coupled between said shaft and the other end of said cantilever arm which transmits the linear motor of said push rod to said shaft and allows said shaft to rotate in accordance with any rotational movement of said pinion, and a winding fly mounted on the end of said shaft for feeding wire to said winding form in accordance with the movement of said shaft.

7. A yoke coil winding machine comprising in combination, a winding station whereat is located a winding form having a winding form head and a removable insert, latching means located at said winding station for mounting said insert on said winding form head, a winding fly for feeding wire to said winding form, a cam mechanism coupled to said winding fly for imparting a predetermined motion to said winding fly thereby winding a coil on said winding form, means located at said winding station for releasing said latching means thereby allowing said insert to be disassembled from said winding form head, disassembly means for removing said insert from said winding form head, and ejection means for removing said coil from said insert.

8. A yoke coil winding machine comprising in combination, a winding station whereat is located a winding form having a winding form head and a removable insert, latching means located at said winding station for mounting said insert on said winding form head, a winding fly for feeding wire to said winding form, a cam mechanism having an equilateral cam and a pair of U-shaped cam followers surrounding said equilateral cam and being driven thereby, a first means coupling one of said U-shaped cam followers to said winding fly for imparting a predetermined radial motion thereto, whereby a radial, square-cornered, rectangular motion is imparted to said winding fly by said first and second means for winding a coil on said winding form, means located at said winding station for releasing said latching means thereby allowing said insert to be disassembled from said winding form head, disassembly means for removing said insert from said winding form head, and ejection means for removing said coil from said insert.

9. A coil winding machine comprising in combination, a winding station whereat is located a winding form of predetermined configuration, means carrying two sets of elements each including an insulated electrical contact, a cutting anvil and a wire clip being mounted in alignment and located at said winding station, a winding fly for supplying wire to said winding form, said wire adapted to be positioned across one set of said elements by said wire clip preceding a wind cycle to provide one coil lead, means for driving said winding fly in a predetermined pattern thereby winding a coil on said winding form, the other coil lead being adapted to be positioned across said other set of elements at the conclusion of the wind cycle by the other wire clip, a packing station whereat is located a packer, means located at said packing station carrying a pair of cutting blades and a pair of electrical contacts in alignment with and adapted to contact the coil, the cutting anvils and contacts, respectively, located at said winding station when said means located at said packing station is activated, and means located at said winding station for disassembling said winding form and reassembling said winding form after the coil is removed.

10. A coil winding machine for automatically winding, packing, curing and ejecting a coil of the type used in deflection yokes for cathode ray pictures, comprising in combination, a winding station whereat is located a winding form, a winding fly for feeding wire to said winding form, a cam driven mechanism for driving said winding fly, said cam mechanism having an equilateral cam and a pair of cam followers, means for coupling one of said cam followers to said winding fly for imparting a predetermined radial motion thereto, means for coupling the other cam follower to said winding fly for imparting a predetermined linear motion thereto whereby a predetermined pattern is thereby followed by said winding fly to wind a coil on said winding form, a packing station whereat is located means for packing said coil in said winding form to a predetermined size, contact means located at said winding station, means located at said packing station cooperating with said contact means for applying an electrical current to the coil on said winding form, means located at said winding station for disassembling and reassembling said winding form, and means associated with said winding form for the ejection of said coil on the disassembly of said winding form.

11. A yoke coil winding machine comprising in combination, a winding station whereat is located a winding form, a winding fly for winding wire to said winding form in a predetermined pattern, means for driving said winding fly in said predetermined pattern to wind a coil on said winding form, a packing station whereat is located means for packing said coil in said winding form, contact means located at said winding station, means located at said packing station cooperating with said contact means for applying an electrical current to said coil, means located at said winding station for disassembling said winding form, and means for removing said coil from said winding form.

12. A yoke coil winding machine comprising in combination, a winding station whereat is located a winding form, a winding fly for winding wire to said winding form in a predetermined pattern, a cam mechanism having an equilateral cam and a pair of U-shaped cam followers driven thereby, means coupling said U-shaped cam followers to said winding fly for driving said winding fly in said predetermined pattern to wind a coil on said winding form, a packing station whereat is located means for packing said coil in said winding form, means for applying an electrical current to said coil, means located at said winding station for disassembling said winding form, and means for removing said coil from said winding form.

References Cited in the file of this patent

UNITED STATES PATENTS

| | | |
|---|---|---|
| 733,633 | Drees | July 14, 1903 |
| 2,114,287 | Cullin | Apr. 19, 1938 |
| 2,336,574 | Selving | Dec. 14, 1943 |
| 2,712,836 | Marzolf | July 12, 1955 |
| 2,740,593 | Zenner | Apr. 3, 1956 |
| 2,824,582 | Reitherman | Feb. 25, 1958 |

FOREIGN PATENTS

| | | |
|---|---|---|
| 155,433 | Australia | Feb. 25, 1954 |